G. H. BUCKLEY.
QUICK SHIFT BENCH VISE.
APPLICATION FILED APR. 12, 1920.
1,412,798.
Patented Apr. 11, 1922.
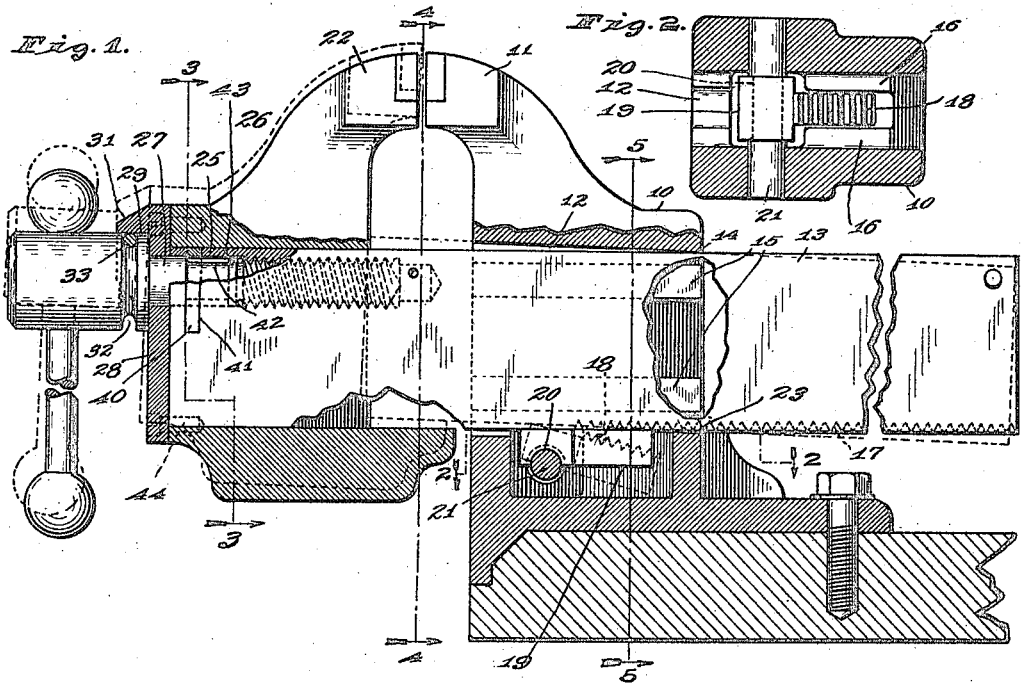
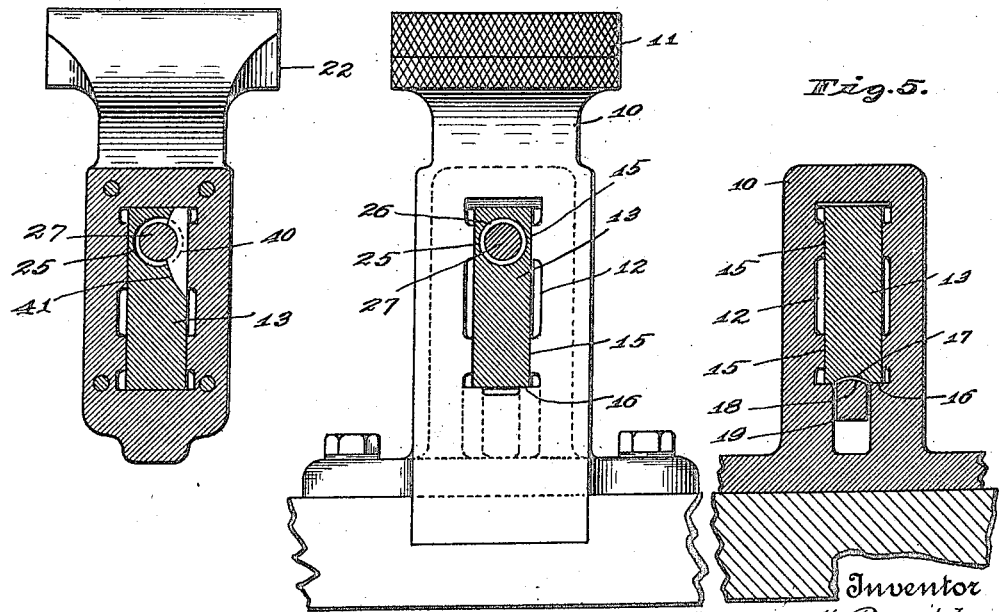
Inventor
George H. Buckley,
By Hood & Schley
Attorneys

UNITED STATES PATENT OFFICE.

GEORGE H. BUCKLEY, OF INDIANAPOLIS, INDIANA, ASSIGNOR TO NATIONAL METAL PRODUCTS COMPANY, OF INDIANAPOLIS, INDIANA, A CORPORATION OF INDIANA.

QUICK-SHIFT BENCH VISE.

1,412,798.  Specification of Letters Patent.  Patented Apr. 11, 1922.

Application filed April 12, 1920. Serial No. 373,127.

*To all whom it may concern:*

Be it known that I, GEORGE H. BUCKLEY, a citizen of the United States, residing at Indianapolis, in the county of Marion and State of Indiana, have invented a new and useful Quick-Shift Bench Vise, of which the following is a specification.

The object of my invention is to produce a substantial, efficient and inexpensive quick-shift vise.

The accompanying drawings illustrate my invention. Fig. 1 is a central vertical section; Fig. 2, a horizontal section, on line 2—2 of Fig. 1, with the sliding jaw shank removed; Fig. 3 a section on line 3—3 of Fig. 1; Fig. 4 a section on line 4—4 of Fig. 1; and Fig. 5 a section on line 5—5 of Fig. 1.

In the drawings, 10 indicates a stationary jaw body adapted to be secured to a bench and provided with jaw 11. Extending horizontally through the main body 10, is a chamber 12, adapted to receive the sliding shank 13, said shank contacting with the upper wearing surface 14, the side wearing surfaces 15, 15, and lower wearing surfaces 16, in chamber 12. The under-side of shank 13 is provided medially with a series of teeth 17, adapted to be engaged by the teeth 18 of a swinging lock 19, provided on its under forward side with a semi-cylindrical seat 20, journaled on pin 21 extending transversely across chamber 12 beneath shank 13, the arrangement being such that shank 13, with its sliding jaw 22, will, under normal conditions, occupy the position shown in full lines in Fig. 1. The chamber 12, however, is cut away at 23, beneath shank 13 and to the rear of lock 19, so that the shank 13 may be tilted, as indicated in dotted lines in Fig. 1, this tilting permitting lock 19 to swing down by gravity so as to withdraw its teeth 18 from teeth 17 of the shank, whereupon, the shank 13 may be slid freely through passage 12 and locked in any desired position by a mere dropping of the shank to normal position, the shank engaging lock 19 at its upper forward corner and positively swinging the teeth of said lock up into mesh with the teeth of the shank.

At its outer end, shank 13 is provided with a bore 25 which, at its inner end is threaded at 26 to receive the threaded shank of an operating spindle 27 which is journaled in an end plate 28 attached to the outer end of the jaw 22 which is slidably mounted on shank 13. Plate 28 is engaged on its outer face by the shoulder 29 of spindle 27, so that adequate pressures may be exerted upon the jaw 22 to drive it toward the jaw 11. Plate 28 is provided with a portion 31 which overhangs the circumferential groove 32 formed in the shank of spindle 27 and a pin 33 passes through said overhanging portion and lies in the groove so jaw 22 may be moved outwardly upon shank 13 by reverse rotation of spindle 27.

The range of movement of jaw 22 on shank 13 is a limited one, and it is desirable to prevent complete withdrawal. I accomplish this result by means of a small key 40, set into a notch 41, formed in shank 13 and held in place by jaw 22. The spindle 27 is ensmalled opposite key 40, for a distance permitting the desired range of movement of jaw 22 on the shank 13, as indicated at 42, so that the outward movement of the spindle 27 will be limited by the engagement of shoulder 43 with key 40. As a consequence, the movement of the jaw 22 and of the screw 27 is limited by the engagement of the ends of the ensmallment 42 with the key 40, and no stress can be placed on the screws 44 which hold the plate 28 in place and so such plate cannot be torn loose, as was a trouble heretofore in quick-shift vises where the movable jaw rather than the screw is limited in its movement, as by a pin-and-slot connection between the main shank and movable jaw.

I claim as my invention:

1. A vice comprising a main body longitudinally chambered, a shank slidably mounted in said chamber and vertically tiltable, a relatively sliding jaw mounted upon said shank to cooperate with the first jaw member, a threaded spindle threaded in the shank and engaging the sliding jaw to shift the same on the shank, and a toothed locking pawl pivotally supported in the jaw chamber beneath the sliding shank and provided with teeth which are adapted to engage and hold the shank against axial movement and which swing downward away from said shank when the latter is tilted.

2. In a vise, the combination with a chambered main jaw, a jaw shank liftably and slidably mounted in said chamber and carrying a jaw cooperating with the first-mentioned jaw, and a locking pawl mounted in the chamber below the shank and pivoted upon a transverse horizontal axis, said locking pawl having on its upper face portions which interlock with portions on the shank and swing downward away from the shank when the latter is lifted.

3. A vise comprising a chambered main jaw, a toothed jaw shank liftably and slidably mounted in said chamber and vertically tiltable, a transverse pivot pin below the shank, and a locking pawl swinging upon said pin, said locking pawl having a toothed portion at its rear end adapted to intermesh with teeth on the shank and to swing downward away from the shank when the latter is lifted, and having a portion lying in front of and above the pivot pin and contacting with the shank to positively swing the toothed portion upwardly into engagement with the shank when the shank is rested upon the pawl.

4. A vise comprising a jaw shank, a jaw slidable thereon, an operating spindle threaded into the shank and engaging the jaw to shift the same on the shank, a key embedded in the shank and cooperating with the spindle to limit its outward movement and a fixed jaw co-operating with said slidable jaw.

5. A vise comprising a jaw shank, a jaw slidable thereon, an operating spindle threaded into the shank, a retaining plate attached to the jaw and having an interlocking engagement with the spindle, a key embedded in the shank and projecting laterally into interlocking engagement with the spindle to limit axial movement thereof, and a fixed jaw co-operating with said slidable jaw.

6. A vise, comprising the combination of a stationary jaw, a shank slidably mounted in such stationary jaw and vertically tiltable, a movable jaw adjustably mounted on said shank, said shank being provided on its underface with transverse teeth which are tapered on both sides, a locking pawl tiltably mounted in said stationary jaw below said shank, said locking pawl having a rearwardly projecting part toothed on its upper face for co-operation with the teeth of said shank, said pawl and shank being provided with co-operating parts whereby tilting downward the front end of said shank forces the end of said pawl positively upward to intermesh the teeth on the pawl and shank.

7. A vise, comprising the combination of a stationary jaw, a shank slidably mounted in such stationary jaw and vertically tiltable, a movable jaw adjustably mounted on said shank, said shank being provided on its underface with transverse teeth, a locking pawl tiltably mounted in said stationary jaw below said shank, said locking pawl having a rearwardly projecting part toothed on its upper face for co-operation with the teeth of said shank, said pawl and shank being provided with co-operating parts whereby tilting downward the front end of said shank forces the end of said pawl positively upward to intermesh the teeth on the pawl and shank.

8. A vise, comprising the combination of a stationary jaw, a shank slidably mounted in such stationary jaw and vertically tiltable, a movable jaw adjustably mounted on said shank, said shank being provided on its underface with transverse teeth which are tapered on both sides, a locking pawl tiltably mounted in said stationary jaw below said shank, said locking pawl having a rearwardly projecting part toothed on its upper face for co-operation with the teeth of said shank and also having a forwardly projecting portion for engagement with the underface of said shank to tilt the rearward end of the pawl upward when the forward end of the shank is tilted downward.

9. A vise, comprising the combination of a stationary jaw, a shank slidably mounted in such stationary jaw and vertically tiltable, a movable jaw adjustably mounted on said shank, said shank being provided on its underface with transverse teeth, a locking pawl tiltably mounted in said stationary jaw below said shank, said locking pawl having a rearwardly projecting part toothed on its upper face for co-operation with the teeth of said shank and also having a forwardly projecting portion for engagement with the underface of said shank to tilt the rearward end of the pawl upward when the forward end of the shank is tilted downward.

In witness whereof, I have hereunto set my hand at Indianapolis, Indiana, this seventh day of April, A. D. one thousand nine hundred and twenty.

GEORGE H. BUCKLEY.